Aug. 7, 1956  F. K. H. NALLINGER  2,757,655
INTERNAL COMBUSTION ENGINE
Filed June 28, 1951  2 Sheets-Sheet 1

Inventor
Friedrich K. H. Nallinger
By Austin, Hicke, Wilhelm
and Padlow
Attorneys Inventor
Friedrich K. H. Nallinger
By Austin, Dicke, Wilhelm
and Padlow
Attorneys

United States Patent Office 2,757,655
Patented Aug. 7, 1956

2,757,655
INTERNAL COMBUSTION ENGINE

Friedrich K. H. Nallinger, Stuttgart, Germany, assignor to Daimler-Benz Aktiengesellschaft, Stuttgart-Unterturkheim, Germany Application June 28, 1951, Serial No. 234,052

Claims priority, application Germany June 28, 1950

7 Claims. (Cl. 123—191)

This invention relates to internal combustion engines having the intake and exhaust valves arranged in the cylinder head. Such type of engine has the advantage that a higher compression ratio and higher speed and thus an increased final output may be obtained more easily. On the other hand, however, the proper accommodation or disposition of sufficiently large valves or valve disks in such types of engine usually encounters difficulties.

It is accordingly an object of the present invention to provide an arrangement for inverted valves in the cylinder head in which the valves, on the one hand, may be made of sufficiently large dimensions practically irrespective of the particular cylinder diameter so as to obtain greater engine outputs, while, at the same time, the cylinder head used by the present invention is simple to manufacture.

A further object of the present invention is the provision of an engine design in which the cylinder and cylinder head castings are of simple construction so as to permit the surfaces and holes, which are arranged perpendicularly or in parallel with each other, to be machined in a simple manner.

A still further object of the present invention is the provision of an arrangement in which the pistons are so designed as to expose toward the combustion chamber the smallest possible surface to thereby minimize the heat transfer.

One feature of the present invention accordingly consists in that the one of the two valves is arranged within or substantially within the cylinder periphery, the other valve being arranged inversely in a position receded with relation to the first valve and conveniently parallel thereto within a combustion space partially projecting beyond the cylinder periphery and substantially constituting the main combustion chamber. According to a further feature of the present invention the walls of the cylinder head limiting the cylinder space and containing the first mentioned valve are so arranged that in the upper dead center the piston head closely approaches said valve.

Some embodiments of the invention are illustrated by way of example in the accompanying drawings in which.

Figure 1:
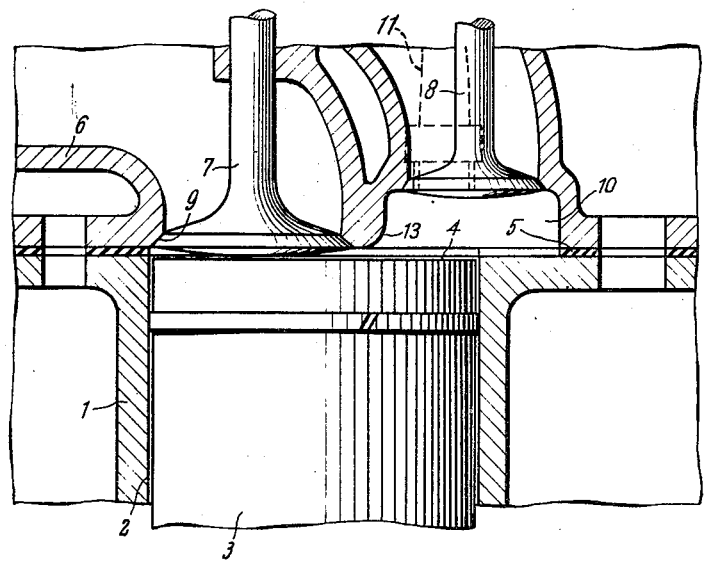
Fig. 1 is a fragmentary vertical section of one engine cylinder.

In the cylinder bore 2 of a water-cooled cylinder casting 1 a piston 3 having a plane piston head 4 is mounted for reciprocation therein in such a manner that the piston head is approximately flush with the joint 5 between engine cylinder and cylinder head 6.

The cylinder head 6 which may be of grey cast iron or light alloy and which may be water-cooled in a manner similar to the engine cylinder 1 contains the two valves 7 and 8, 7 preferably being the intake valve which is located immediately adjacent the joint 5, which forms the plane lower surface of the cylinder head so that in the upper dead center the piston head surface 4 closely approaches the intake valve 7. If it is desired that the intake valve be able to open already prior to the beginning of the suction stroke, then the valve seat 9 may be receded into the cylinder head with respect to the point 5 by a predetermined amount.

Figure 5:
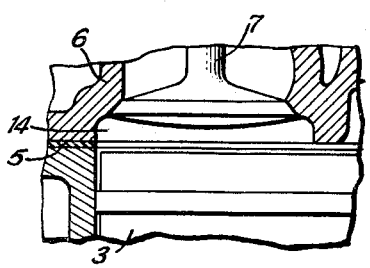
Figure 5 is a partial cross-sectional view through an engine showing a modification in accordance with the present invention.

Such modification is illustrated in Figure 5, in which the inlet valve 7 is displaced with respect to the separating joint 5 by a small amount, so that a small pocket 14 is formed of such depth that the valve 7 may already open prior to the time at which the piston is in the top dead-center position without colliding or coming in contact with the piston head.

The valve 8 which is preferably the exhaust valve is located in the upper wall defining the combustion chamber pocket 10 which, as seen in a plan view, adjoins approximately tangentially the periphery of the engine cylinder but projects beyond the periphery of the engine cylinder and is delimited on its lower side by the joint 5. The spark plug or plugs, and in the case of an injection-type engine, for instance, also the injection nozzle or nozzles, are appropriately located in the combustion chamber pocket 10 and preferably at point 11, as shown in Fig. 2, adjacent the valve 8 so that, as seen in a plan view, they are placed within the inner periphery of the engine cylinder and consequently at points where the charge passes which is displaced from the side of the intake valve out of the cylinder space into the combustion chamber pocket.

It will be obvious that the invention provides intake and exhaust valves of any desired size independently of the cylinder diameter. In the embodiment shown, the intake valve is arranged wholly within the inner periphery of the cylinder whereas the exhaust valve lies within the inner periphery of the cylinder only with approximately one half of its face or surface. At the point of transition 13 of the side wall surface forming the combustion chamber pocket 10 in the cylinder head 6 which contains the intake valve 7, a portion of the wall, and more particularly the lower edge thereof, may be rounded off so as to permit an inflow of the combustion charge into the combustion chamber pocket during the compression stroke which is as free as possible from flow losses and to permit an outflow of the charge during the working stroke of the engine which is equally as free as possible from flow losses.

Figure 2:
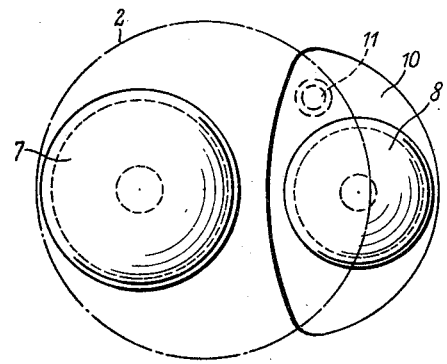
Fig. 2 is an inverted or bottom plan view showing the arrangement of the valves in the cylinder head.
Figure 3:
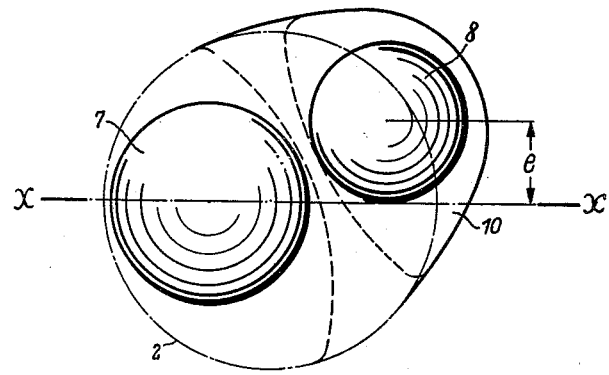
Figs. 3 and 4 show two modified forms of construction in a plan view similar to Fig. 2.
Figure 4:
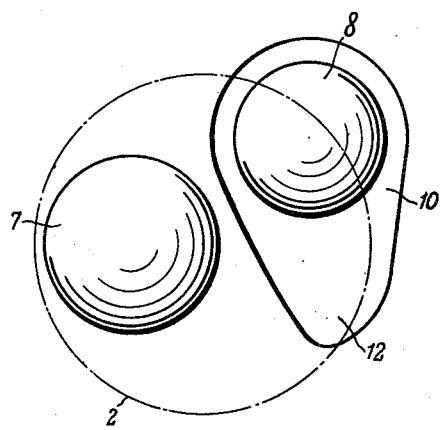

The examples of construction shown in Figs. 3 and 4 differ from that of Fig. 2 substantially only in that the valves 7 and 8 are arranged offset with relation to the axis x—x and in particular to a transverse axis extending at right angles to the longitudinal axis of the engine, for instance, by the amount e as shown in Figure 3. The accommodation of the valve controlling means will be facilitated and simplified by such opposite arrangement, i. e., such displacement of the inlet valve and outlet valve in the longitudinal direction of the engine or perpendicular to the cross axis x—x permits an arrangement of a conventional control mechanism for actuating the valves, such as, for example, of the push rods, adjacent each other in the longitudinal direction of a multi-cylinder engine. Such an arrangement is more advantageous than if all the valves were arranged in a common transverse plane as in the latter case with a control arrangement of the valves by a common, laterally-arranged cam shaft, the rocking levers of at least one of the two valves would have to be bent to pass around the other valve, as seen in a plan view.

Whereas in the embodiment according to Figure 3 the combustion chamber pocket 10 is designed essentially symmetrically with respect to a plane including the cylinder axis and the axis of valve 8, the combustion chamber pocket 10 is arranged unilaterally or asymmetrically thereto in the example of construction according to Fig. 4. In this case the spark plug is conveniently located at 12. The configuration of the combustion chamber pocket 10 in Fig. 4 further enables the provision of a rotary movement of the air entering the pocket. It will be obvious that the valve 7 may also be arranged offset with respect to the transverse axis x—x for instance, on the side thereof opposite the side on which valve 8 is located.

As to the remainder of the details of the construction of the modifications shown in Figures 3 and 4 such details are similar to those more fully shown and described in connection with Figures 1 and 2.

While this description has reference to particular forms of the invention it will be obvious that various other forms and modifications may be resorted to without departing from the scope of the invention.

What I claim is:

1. An internal combustion chamber comprising a cylinder block housing having at least one cylinder, a cylinder head separated from said cylinder block by a plane separating joint, a combustion chamber in said cylinder head open to and limited by said joint and arranged laterally with respect to the cylinder axis, said combustion chamber extending partially beyond the cylinder periphery and having a concavely curved surface defining the outer wall of said combustion chamber, said outer wall forming the largest dimension of said combustion chamber and adjoining essentially tangentially said cylinder periphery, as seen in a plane perpendicular to the cylinder axis, the radial width of said combustion chamber being essentially one-half said last-mentioned dimension and the height of said combustion chamber in the direction of the cylinder axis being essentially one-half said radial width, said radial width extending, as seen in a plan view in the direction of the cylinder axis, essentially one-half within the cylinder periphery and essentially one-half beyond said periphery, a first valve in the cylinder head above the cylinder on the side of said cylinder axis opposite said combustion chamber and a second valve in said combustion chamber arranged with the axis thereof near the cylinder periphery, both valves being arranged in an inverted position parallel to the cylinder axis.

2. An internal combustion engine according to claim 1, wherein the surface of the cylinder head limiting the cylinder lies substantially in said separating joint, the head of said first valve, as seen in the direction of the cylinder axis, being located in the surface of said cylinder head wholly within the cylinder periphery and extending nearly from the inner wall of said combustion chamber to the opposite side of the cylinder periphery, the head of said second valve extending nearly over the entire width of said combustion chamber.

3. An internal combustion chamber comprising a cylinder block housing having at least one cylinder, a cylinder head separated from said cylinder block by a plane separating joint, a combustion chamber in said cylinder head open to and limited by said joint and arranged laterally with respect to the cylinder axis, said combustion chamber extending partially beyond the cylinder periphery and having a curved surface defining the outer wall of said combustion chamber, said outer wall forming the largest dimension of said combustion chamber and adjoining essentially tangentially said cylinder periphery as seen in a plane perpendicular to the cylinder axis, the radial width of said combustion chamber being substantially smaller than said last-named dimension and the height of said combustion chamber in the direction of the cylinder axis being substantially smaller than said radial width, said radial width extending, as seen in a plan view in the direction of the cylinder axis, to a considerable extent within the cylinder periphery and to a similar extent beyond said periphery, a first valve in said cylinder head above the cylinder on the side of said cylinder axis opposite said combustion chamber, and a second valve in the cylinder head in said combustion chamber arranged with the axis thereof near the cylinder periphery, both valves being arranged in an inverted position parallel to the cylinder axis.

4. An internal combustion engine according to claim 3, further comprising a spark plug asymmetrically arranged in said combustion chamber opposite said second valve with respect to a center section of said combustion chamber extending radially from the cylinder axis.

5. An internal combustion engine according to claim 3, wherein said first valve is an intake valve and said second valve is an exhaust valve.

6. An internal combustion engine according to claim 3 wherein the piston is provided with a plane piston head closely approaching the plane of said separating joint in the upper piston dead center and wherein the lower edge of the wall defining the combustion chamber within the cylinder periphery is rounded off to facilitate inflow of the combustion charge into said combustion chamber during the compression stroke and to facilitate outflow of the charge during the working stroke of the engine.

7. An internal combustion chamber comprising a cylinder block housing having at least one cylinder, a cylinder head separated from said cylinder block by a plane separating joint, a combustion chamber in said cylinder head defined by said separating joint and located laterally with respect to the cylinder axis on the side of said separating joint opposite said cylinder, said combustion chamber comprising a curved outer wall portion having a radius of curvature of lesser dimension than the radius of said cylinder with the center thereof displaced laterally with respect to the cylinder axis, said curved outer wall portion being formed to pass essentially tangentially into the periphery of said cylinder, essentially one-half of the radial dimension of said combustion chamber lying within the cylinder periphery and essentially one-half of the radial dimension lying beyond said cylinder periphery, a first valve located in said combustion chamber with the axis thereof lying in the vicinity of the periphery of the cylinder, said first valve extending over nearly the entire radial dimension of said combustion chamber, a second valve in said cylinder head of diametric dimension greater than the radial dimension of said cylinder and with the axis thereof located in said cylinder head on the side opposite said combustion chamber relative to the cylinder axis.

References Cited in the file of this patent

UNITED STATES PATENTS

| | | |
|---|---|---|
| 1,865,849 | Gardiner | July 5, 1932 |
| 1,887,897 | Whatmough | Nov. 15, 1932 |
| 1,986,418 | Smith | Jan. 1, 1935 |
| 2,094,893 | Jacoby | Oct. 5, 1937 |
| 2,157,659 | Fischer | May 9, 1939 |
| 2,214,941 | Taub | Sept. 17, 1940 |

FOREIGN PATENTS

| | | |
|---|---|---|
| 953,282 | France | May 16, 1949 |